US012731453B2

(12) United States Patent
Umeda

(10) Patent No.: US 12,731,453 B2
(45) Date of Patent: Sep. 8, 2026

(54) COIN HANDLING APPARATUS

(71) Applicant: ASAHI SEIKO CO., LTD, Tokyo (JP)

(72) Inventor: Masayoshi Umeda, Saitama (JP)

(73) Assignee: ASAHI SEIKO CO., LTD, Tokyo (JP)

( * ) Notice: Subject to any disclaimer, the term of this patent is extended or adjusted under 35 U.S.C. 154(b) by 980 days.

(21) Appl. No.: 17/980,224

(22) Filed: Nov. 3, 2022

(65) Prior Publication Data

US 2023/0147666 A1 May 11, 2023

(30) Foreign Application Priority Data

Nov. 5, 2021 (JP) ................................ 2021-180730

(51) Int. Cl.

| | |
|---|---|
| ***G07F 9/10*** | (2006.01) |
| ***G07D 1/00*** | (2006.01) |
| ***G07D 3/00*** | (2006.01) |
| ***G07D 9/00*** | (2006.01) |
| ***G07F 1/04*** | (2006.01) |

(52) U.S. Cl.

CPC ................ *G07F 9/10* (2013.01); *G07D 1/00* (2013.01); *G07D 9/008* (2013.01); *G07F 1/04* (2013.01); *G07D 3/00* (2013.01); *G07D 2201/00* (2013.01)

(58) Field of Classification Search

CPC ........ G07D 1/00; G07D 3/00; G07D 2201/00; G07D 9/008; G07F 9/10; G07F 1/04

USPC ............................ 193/DIG. 1; 194/344, 350

See application file for complete search history.

(56) References Cited

U.S. PATENT DOCUMENTS

| | | | | |
|---|---|---|---|---|
| 4,558,711 | A * | 12/1985 | Ikuta Yoshiaki | G07D 3/14 453/3 |
| 5,176,238 | A * | 1/1993 | Deglau | G07D 5/00 194/344 |
| 6,776,703 | B2 | 8/2004 | Abe et al. | |
| 10,342,363 | B2 * | 7/2019 | Park | A47F 3/0434 |
| 11,972,654 | B2 * | 4/2024 | MacKay | G07F 9/009 |

(Continued)

FOREIGN PATENT DOCUMENTS

| | | |
|---|---|---|
| JP | 2003-196695 | 7/2003 |
| JP | 2007-267887 | 10/2007 |
| JP | 6934678 B2 | 9/2021 |

OTHER PUBLICATIONS

Office Action issued in Corresponding JP Patent Application No. 2021-180730, dated Jan. 11, 2024, along with an English translation thereof.

(Continued)

*Primary Examiner* — Jeffrey A Shapiro

(74) *Attorney, Agent, or Firm* — Greenblum & Bernstein, P.L.C.

(57) ABSTRACT

To provide a coin handling apparatus not requiring a wide work area with easy maintenance. In view of the above, a first door is arranged on a surface on one side of a coin handling apparatus and a second door is arranged in the first door. The first door forms dispensing paths for coins discharged from coin hoppers housed in the coin handling apparatus with the second door, and is a partition plate separating a space for housing the coin hoppers from the dispensing paths for coins. In the coin handling apparatus, maintenance of the dispensing paths can be performed by opening the second door, and maintenance of the coin hoppers can be performed by opening the first door.

9 Claims, 9 Drawing Sheets

(56) References Cited

U.S. PATENT DOCUMENTS

| | | | | |
|---|---|---|---|---|
| 2003/0148729 | A1 * | 8/2003 | Abe | G07D 1/02 453/57 |
| 2008/0171508 | A1 | 7/2008 | Enomoto et al. | |
| 2019/0073851 | A1 * | 3/2019 | Umeda | G07D 3/14 |
| 2020/0253679 | A1 * | 8/2020 | Mann | A47F 1/08 |
| 2020/0286319 | A1 | 9/2020 | Yamamiya | |

OTHER PUBLICATIONS

Office Action issued in Corresponding EP Patent Application No. 22201764.2, dated Jun. 12, 2024.
Extended European Search Report Issued in Corresponding EP Patent Application No. 22201764.2, dated Jun. 6, 2023.
European Search Report Issued in Corresponding EP Patent Application No. 22201764.2, dated Mar. 24, 2023.

* cited by examiner

COIN HANDLING APPARATUS

BACKGROUND OF THE INVENTION

1. Field of the Invention

The present invention relates to a coin handling apparatus depositing and dispensing coins.

2. Description of Related Art

In general, circulating money issued by the country includes coins in a plurality of denominations. As coins are different in diameter, thickness, material and design according to denominations, anyone can easily identify denominations. The coins also have different characteristics according to denominations; therefore, identification of denominations can be made by a machine. A coin handling apparatus can store coins in storage parts according to their denominations and can dispense a desired number of coins from the storage parts.

For example, a coin handling apparatus is disclosed in Japanese Patent No. 6934678. After coins are put into a deposit port, the coins are identified by their denominations, and the coins are stored in coin hoppers according to the denominations of the coins. The coin hoppers dispense a desired number of coins one by one under the control by a controller.

The coin handling apparatus is provided with four coin hoppers at an upper tier and four coin hoppers at a lower tier. In the middle of conveying paths for coins with denominations identified, gates opening and closing according to denominations of coins which pass through the gates are disposed. Distribution paths connected to the coin hoppers for corresponding denominations are connected to respective gates. The coin handling apparatus is also provided with dispensing paths guiding coins from discharge ports of the coin hoppers to a dispensing port of the coin handling apparatus. The distribution paths and the dispensing paths are arranged on a discharge ports' side of the coin hoppers.

SUMMARY OF THE INVENTION

Jamming of coins may occur in the dispensing paths in the coin handling apparatus, and a coin handling apparatus which is easy in maintenance of the dispensing paths has been desired.

In a case where the coin handling apparatus is provided with the distribution paths and the dispensing paths on one side which is a discharge side where coins are discharged from the coin hoppers, it is necessary to remove an exterior part on one side and an exterior part on the other side facing one side when performing maintenance such as elimination of jamming of coins, attachment/detachment of coin hoppers, and refilling or taking-out of coins. Accordingly, there is a problem that work areas are necessary on both sides of one side and the other side and it is difficult to install the coin handling apparatus in a narrow space.

A coin handling apparatus according to an embodiment of the present invention includes coin hoppers storing coins and discharging the stored coins one by one, a partition plate separating a space where the coin hoppers are housed from paths for the coins discharged from the coin hoppers, and a case housing the coin hoppers, in which the partition plate is a door provided in a side surface on one side of the case, and the coin hoppers are exposed by opening the door.

According to the present invention, it is possible to provide a coin handling apparatus capable of reducing a work area for maintenance of the coin handling apparatus and capable of easily performing maintenance of coin hoppers housed in the apparatus.

DESCRIPTION OF EMBODIMENTS

Hereinafter, an embodiment of the present invention will be explained in detail with reference to the drawings of FIG. 1 to FIG. 9. Respective drawings are schematically shown to a degree that the present invention can be sufficiently understood. Therefore, the present invention is not limited to shown examples. In respective drawings, same symbols are given to common components or similar components, and repeated explanation thereof is omitted. In addition, "coins" include coins having prescribed thicknesses and diameters, coins having a disc shape such as tokens, and further, coins having polygonal shapes such as an octagon.

Figure 1:
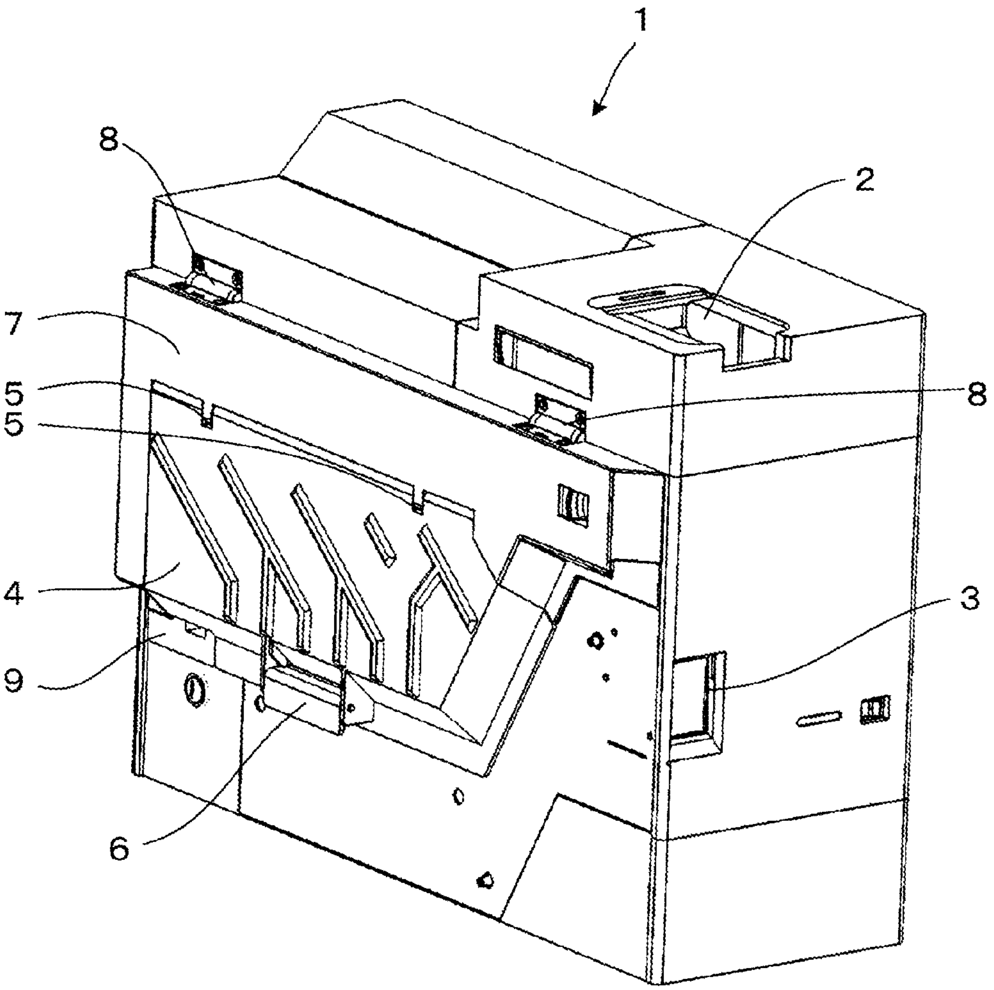
FIG. 1 is a perspective view of a coin handling apparatus.
Figure 2:
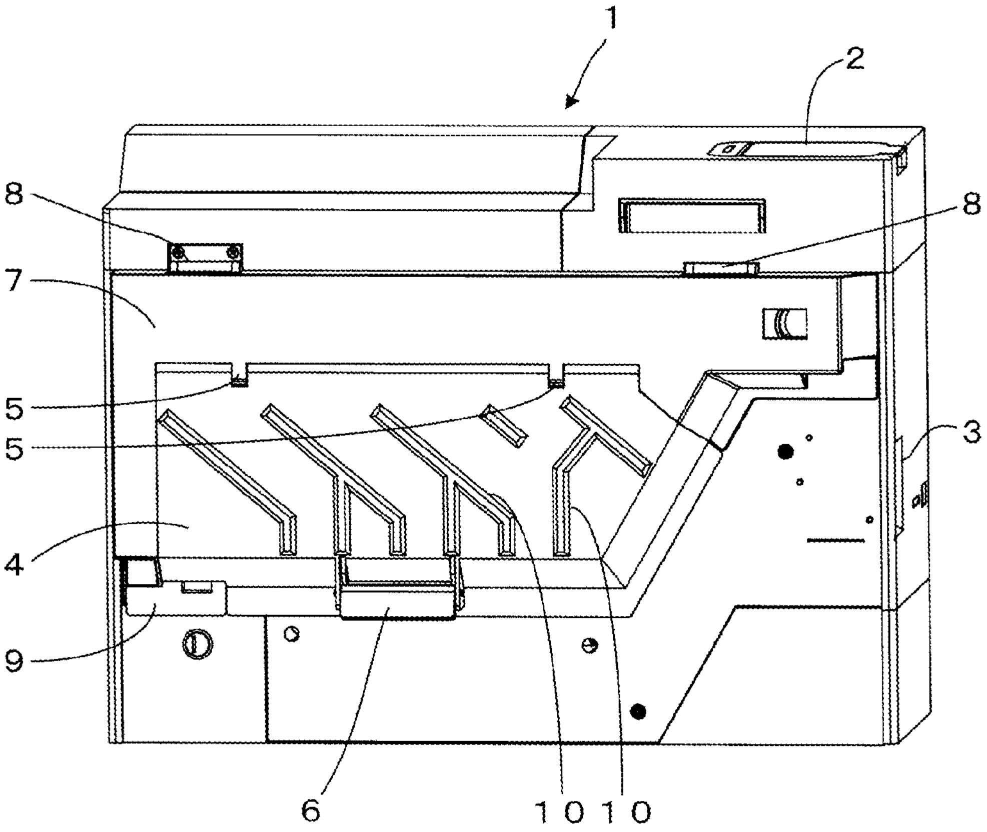
FIG. 2 is a side view of a door side of the coin handling apparatus.

First, the appearance of a coin handling apparatus 1 will be explained with reference to FIG. 1 and FIG. 2. FIG. 1 is a perspective view of the coin handling apparatus 1. FIG. 2 is a side view of a door side of the coin handling apparatus 1.

The coin handling apparatus 1 deposits coins, identifies denominations of the deposited coins, and stores the coins in coin hoppers according to denominations on the basis of the identification result. When coins are dispensed from the coin handling apparatus 1, coins are discharged one by one from a coin hopper of a desired denomination. The coin handling apparatus 1 is covered with an exterior case to house devices such as coin hoppers.

The coin handling apparatus 1 is provided with a deposit port 2 into which coins are deposited on an upper surface thereof. A dispensing port 3 from which coins are dispensed is provided at the front of the coin handling apparatus 1.

A second door 4 and a first door 7 are provided on a side surface on one side of the coin handling apparatus 1. The first door 7 has the second door 4. An upper part of the second door 4 is connected to the first door 7 by second hinges 5. The second door 4 opens and closes so as to pivot about the second hinges 5. The second door 4 can be opened and closed by a second handle 6.

An upper part of the first door 7 is connected to a body of the coin handling apparatus 1 by first hinges 8. The first door 7 opens and closes so as to pivot about the first hinges 8. The first door 7 can be opened and closed by a first handle 9.

Engaging parts 10 protrude from the surface of the second door 4. Recessed parts are arranged on the back side of the engaging parts 10 of the second door 4. The protrusions arranged on the first door 7 are fitted to the recessed parts on the back side of the engaging parts 10. When the second door 4 is closed, paths for coins are formed between the first door 7 and the second door 4 by the first door 7 and the second door 4.

Figure 3:
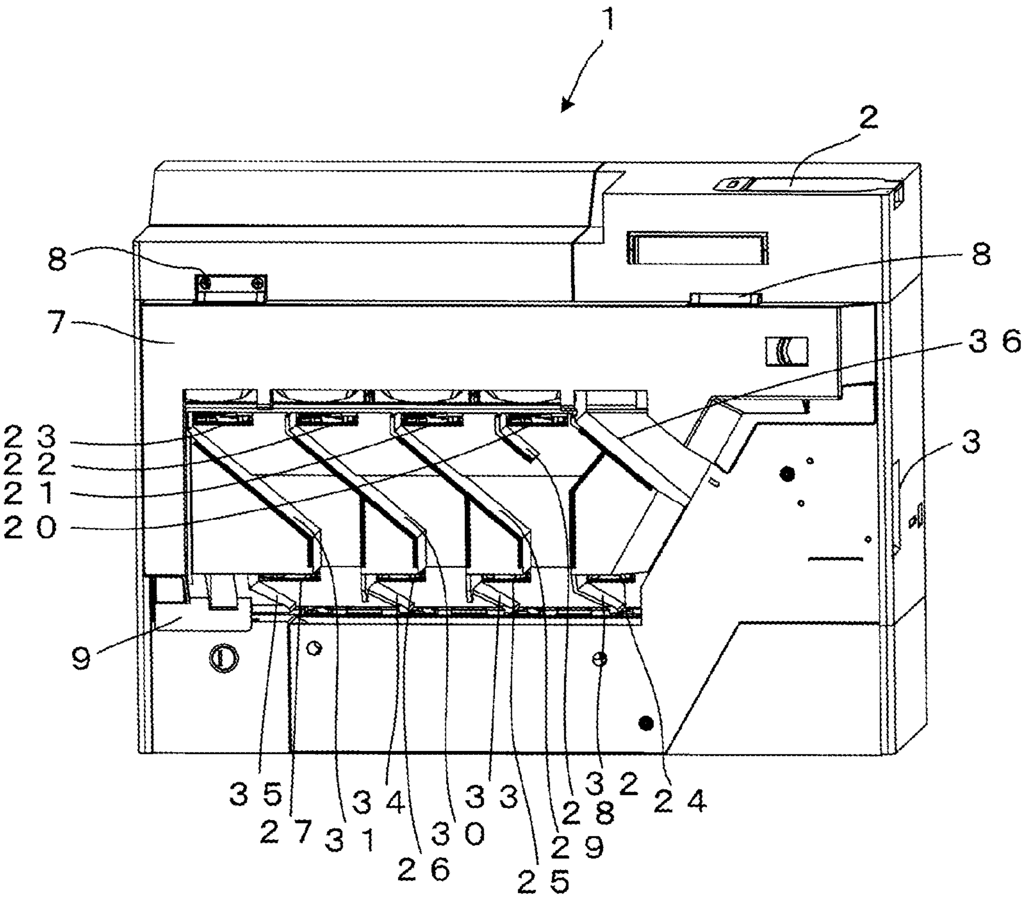
FIG. 3 is a first view for explaining a structure on the door side of the coin handling apparatus.

Next, a case where the second door 4 is opened will be explained. FIG. 3 is a first view for explaining a structure on the door side of the coin handling apparatus. Actually, a lower part of the second door 4 is opened so as to pivot about the second hinges 5. FIG. 3 is a view showing a state where the second door 4 is removed for making the explanation easy.

The first door 7 is provided with later-described through holes. The through holes are arranged in the first door 7 so as to correspond to respective coin hoppers of the coin handling apparatus 1. A coin to be discharged from the coin hopper passes through the through hole of the first door 7 and is dropped on a belt arranged at a lower part. The through holes of the first door 7 correspond to a first discharge port 20, a second discharge port 21, a third discharge port 22, and a fourth discharge port 23 aligned at the upper part of the first door 7, and a fifth discharge port 24, a sixth discharge port 25, a seventh discharge port 26, and an eighth discharge port 27 aligned at the lower part of the first door 7. A row of discharge ports arranged at the upper part of the first door 7 and a row of discharge ports arranged at the lower part thereof are arranged so as to be shifted in a horizontal direction.

A first slope part 28 is arranged below the first discharge port 20 of the first door 7. The first slope part 28 receives coins fed from the first discharge port 20 and slides the coins along the slope. Similarly, a second slope part 29 is provided below the second discharge port 21 of the first door 7, a third slope part 30 is provided below the third discharge port 22, a fourth slope part 31 is provided below the fourth discharge port 23, a fifth slope part 32 is provided below the fifth discharge port 24, a sixth slope part 33 is provided below the sixth discharge port 25, a seventh slope part 34 is provided below the seventh discharge port 26, and an eighth slope part 35 is provided below the eighth discharge port 27, respectively. A reject slope part 36 is a path for returning a coin the denomination of which is difficult to be identified.

The first slope part 28 to the eighth slope part 35, and the reject slope part 36 are protrusions standing from the surface of the first door 7. When the second door 4 is closed, tip sides of the protrusions are fitted to recessed parts arranged on the back side of the second door 4.

The first door 7 also functions as a partition plate forming part of the paths for coins discharged from the coin hoppers and separating a space for housing the coin hoppers inside the coin handling apparatus 1 from the paths for coins.

The reject slope part 36 is arranged above the fifth discharge port 24. Similarly, the second slope part 29 is arranged above the sixth discharge port 25, the third slope part 30 is arranged above the seventh discharge port 26, and the fourth slope part 31 is arranged above the eighth discharge port 27. Upper parts of the fifth to eighth discharge ports 24, 25, 26, and 27 arranged at the lower part of the first door 7 are covered with the slope parts so that coins discharged from the upper part do not pass the front of discharge ports. The respective discharge ports are arranged on a vertical direction side of the slope parts. According to this structure, it is possible to prevent discharge of coins from the discharge ports at the lower part from being interrupted by coins dropping from above.

The first door 7 is provided with the discharge ports for coins corresponding to respective coin hoppers and slope parts where discharged coins are slid. The slope parts suppress dropping speed of coins and guide coins to a particular dropping position. The first door 7 also separates the space where the coin hoppers are housed from the paths for coins on the dispensing side. Since the coin hoppers store coins, it is necessary to make the coin hoppers not easily touched. As the space where the coin hoppers are housed is partitioned from the paths for the coins on the dispensing side, maintenance work only targeted at the paths for coins can be executed without touching the coin hoppers when a problem occurs at the path for coins.

The engaging parts 10 of the second door 4 are disposed at positions corresponding to respective slope parts of the first door 7. When the second door 4 is closed, cylindrical paths for coins are formed by the first door 7 and the second door 4. In addition, it is preferable that the second door 4 is made of transparent resin. When the second door 4 is made to be transparent, it is possible to visually recognize the inside of paths in a state where the second door 4 is closed.

Figure 4:
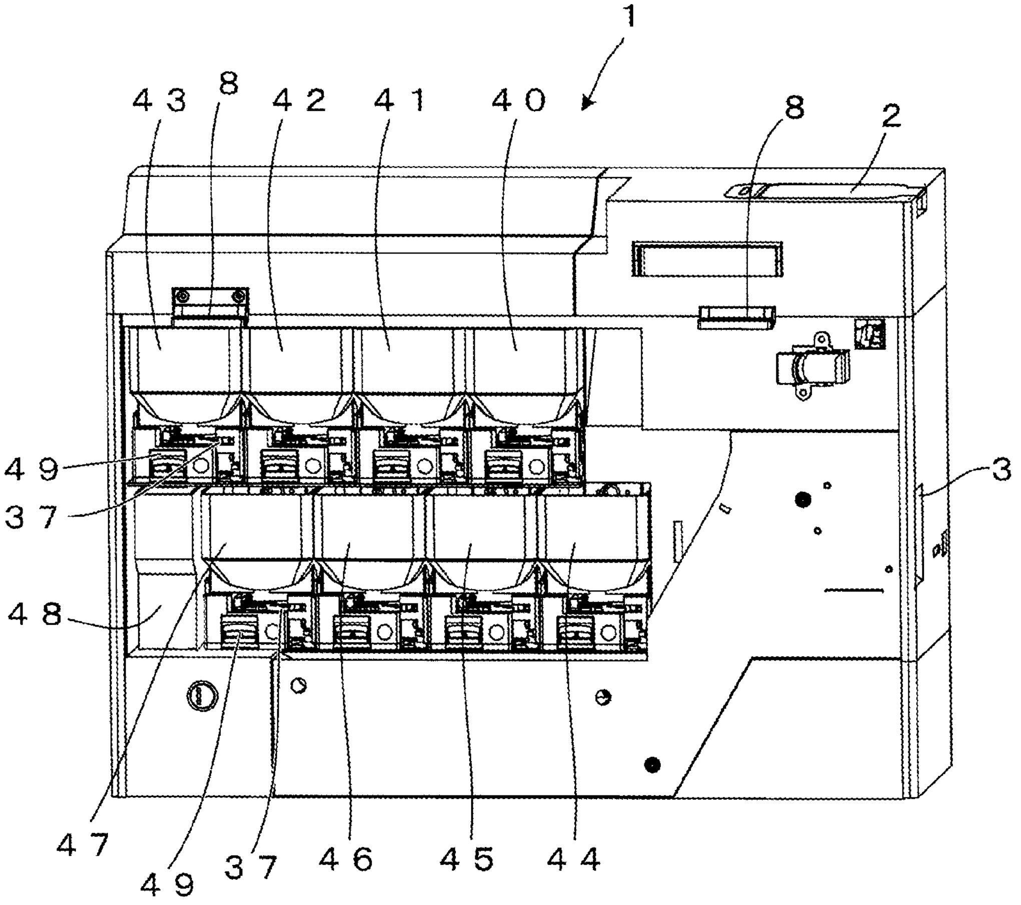
FIG. 4 is a second view for explaining a structure on the door side of the coin handling apparatus.

Next, a case where the first door 7 is opened will be explained. FIG. 4 is a second view for explaining a structure on the door side of the coin handling apparatus. Actually, a lower part of the first door 7 is opened so as to pivot about the first hinges 8. FIG. 4 is a view showing a state where the first door 7 is removed for making the explanation easy.

A first hopper 40, a second hopper 41, a third hopper 42, and a fourth hopper 43 are coin hoppers aligned in an upper tier. A fifth hopper 44, a sixth hopper 45, a seventh hopper 46, and an eighth hopper 47 are coin hoppers aligned at a lower tier. The coin hoppers are arranged so as to be separated into two tiers which are the upper tier and the lower tier. As the coin handling apparatus 1 is provided with eight coin hoppers, eight dominations of coins can be dealt with. An overflow container 48 stores coins when the coin hoppers are full and are not capable of storing coins. The respective coin hoppers are placed on a base. Each coin hopper is provided with a gripping part 49. The gripping part 49 is provided with a later-described engaging mechanism. The engaging mechanism engages the coin hopper with the base.

Each coin hopper is provided with discharging parts 37 for discharging coins. In a state where respective coin hoppers are attached to the base, the discharging parts 37 correspond to respective discharge ports of the first door 7. A width of the overflow container 48 is approximately half of a width of the coin hopper. As the overflow container 48 is provided at the lower tier, positions in the horizontal direction of the coin hoppers in the row of the lower tire differ from positions of the coin hoppers in the row of the upper tire by the width of the overflow container 48.

When the first door 7 is opened, all coin hoppers housed inside are exposed and can be inserted/extracted. A discharge side of coins in the coin hoppers is exposed and the gripping parts 49 can be operated. The coin hoppers are placed and fixed on the bases disposed in the coin handling apparatus 1. The engaging mechanisms of the coin hoppers are unlocked by operating the gripping parts 49, and the coin hoppers can be moved in the horizontal direction. The coin hoppers can be pulled out while being slid in the horizontal direction. When attaching the coin hopper, an end of the coin hopper is placed in the base and pushed in the horizontal direction. A connector is joined and the engaging mechanism is operated to thereby fix the coin hopper to the base.

The coin hoppers can be attached and detached easily at a place where the first door 7 can be opened/closed.

Figure 5:
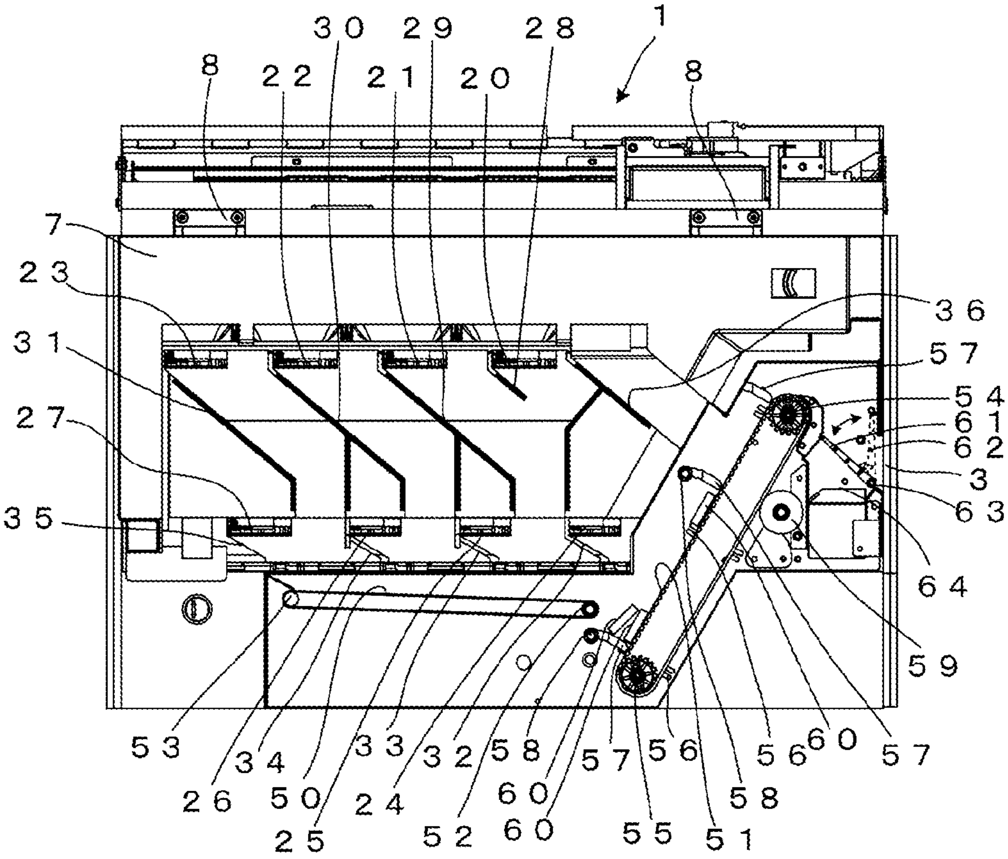
FIG. 5 is a view for explaining a discharge path for coins in the coin handling apparatus.

Next, a moving route of discharged coins will be explained. FIG. 5 is a view for explaining a discharge path for the coins in the coin handling apparatus. FIG. 5 is a view showing a state where the second door 4 is removed and part of the exterior part on the side surface of the coin handling apparatus 1 is removed for making the explanation easy.

The coin is discharged from any of the first discharge port 20 to the eighth discharge port 27. The discharged coin slides down each slope part and is placed on a first belt 50. The first belt 50 is hung around a first drive pulley 52 and a first driven pulley 53, rotating by driving the first drive pulley 52. The coin placed on the first belt 50 is conveyed in a direction of a second belt 51. The coin placed on the first belt 50 is dropped on the second belt 51 from an end of the first belt 50. The first drive pulley 52 is driven by a not-shown motor. The first belt 50 is inclined downward toward the direction of the second belt 51.

The second belt 51 is hung around a second drive pulley 54 and a second driven pulley 55, rotating by driving the second drive pulley 54. The coin placed on the second belt 51 is conveyed in a direction of the dispensing port 3. The second drive pulley 54 is driven by a not-shown motor.

A coin 60 conveyed from the first belt 50 and a coin 60 sliding down from the reject slope part 36 are supplied onto the second belt 51.

The second belt 51 is arranged while being inclined, conveying the coin 60 from the lower part to the upper part. The coin 60 is dropped from an upward end of the second belt 51 to a direction of the dispensing port 3.

The second belt 51 is provided with belt pushing bodies 56 so that the coin 60 does not slide down. A plurality of belt pushing bodies 56 are provided on the surface of the second belt 51. For example, a height of the belt pushing bodies 56 is set to be lower than a thickness of the coin 60 to be used. The belt pushing bodies 56 support and convey coins one by one. When two pieces of coins overlap, an upper-side coin passes over the belt pushing body 56 and slides down.

In the path for the coin 60, non-return levers 57 are provided at plural places along the second belt 51. The non-return levers 57 are supported by lever shafts 58. The non-return levers 57 stop the coin 60 from dropping downward. For example, when a plurality of coins 60 are supplied onto the second belt 51 at a time, it is difficult to convey all coins 60 at a time by the belt pushing bodies 56. The non-return levers 57 stop the coins 60 which are not conveyed from dropping downward. Each non-return lever 57 stops at a position with an angle approximately perpendicular to the second belt 51 and swings to the conveying direction's side of the coin 60 from that position. The non-return lever 57 is pushed up by the belt pushing body 56 moving from below and allowing the belt pushing body 56 to pass. After the belt pushing body 56 passes, the non-return lever 57 returns to the original position with the angle approximately perpendicular to the second belt 51, and stops.

A tension roller 59 is pushed toward the second belt 51 to thereby make the second belt 51 in a tightened state.

A flap 61 is arranged in the middle of the path for the coin between an end of the second belt 51 in the conveying direction of the coin 60 and the dispensing port 3. The flap 61 guides the coin 60 supplied from the second belt 51 to the dispensing port 3 or to a safe path 64. The flap 61 is pivotally supported by a flap shaft 63 so as to move to a flap released position 62 shown by a dotted line by a not-shown drive means.

The safe path 64 is connected to a not-shown safe. When the flap 61 is driven to the flap released position 62, the coin 60 can be stored in the safe, not being discharged from the dispensing port 3. When the flap 61 is driven to the flap released position 62, the dispensing port 3 can be blocked to thereby prevent illegal operation. As the second belt 51 is arranged while being inclined, the dispensing port 3 can be arranged at a higher position, and further, the safe and the safe path 64 can be arranged.

Figure 6:
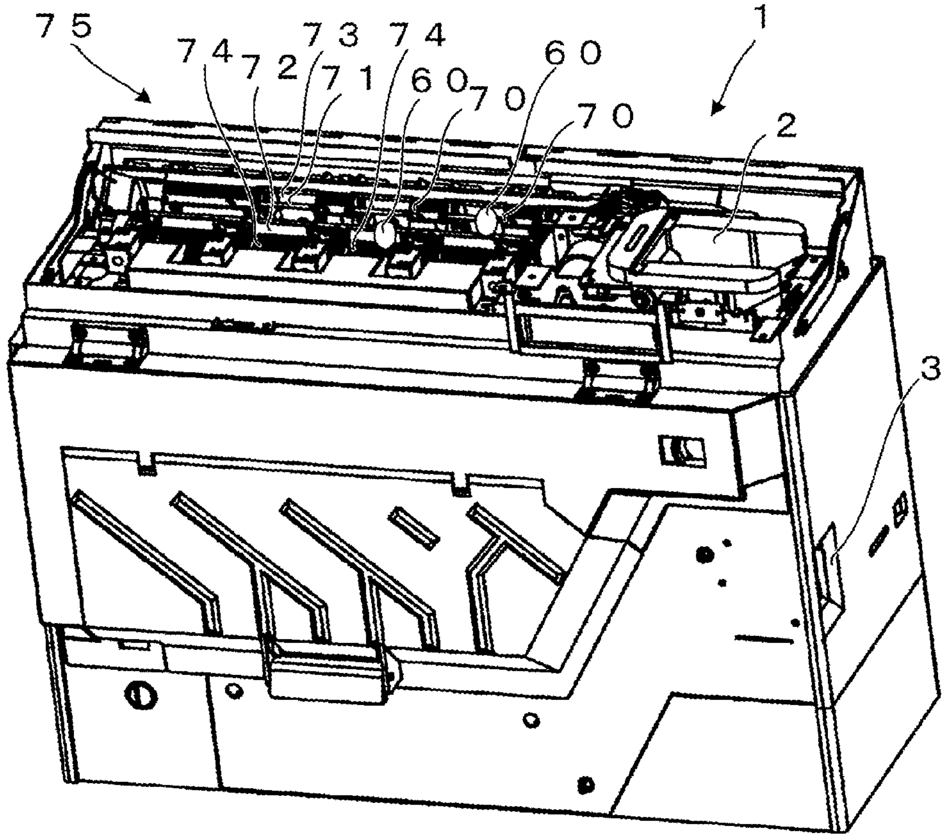
FIG. 6 is a view for explaining distribution paths for coins in the coin handling apparatus.

FIG. 6 is a view for explaining distribution paths for coins in the coin handling apparatus.

The coins 60 put into the deposit port 2 are separated one by one, conveyed one by one, and denominations thereof are identified. The identified coins 60 are conveyed to a distribution part 75. The coins 60 are conveyed by pushing pins 70 in the distribution part 75. A distribution bar 71 and a distribution flap 72 are arranged in the middle of the conveying path for the coins 60. The distribution bar 71 and the distribution flap 72 are arranged so as to correspond to each coin hopper.

The distribution bar 71 controls whether the coin 60 is guided to a bar-side path 73 or not. The distribution flap 72 controls whether the coin 60 is guided to a flap-side path 74 or not. When the distribution bar 71 is closed, the conveyed coin 60 passes the bar-side path 73. When the distribution bar 71 is opened, the conveyed coin 60 is guided to the bar-side path 73. When the distribution flap 72 is closed, the conveyed coin 60 passes the flap-side path 74. When the distribution flap 72 is opened, the conveyed coin 60 is guided to the flap-side path 74. The bar-side path 73 is connected to the coin hopper arranged in the lower tier, and the flap-side path 74 is connected to the coin hopper arranged in the upper tier. The distribution bars 71 and the distribution flaps 72 corresponding to the reject slope part 36 and the overflow container 48 are also arranged.

Figure 7:
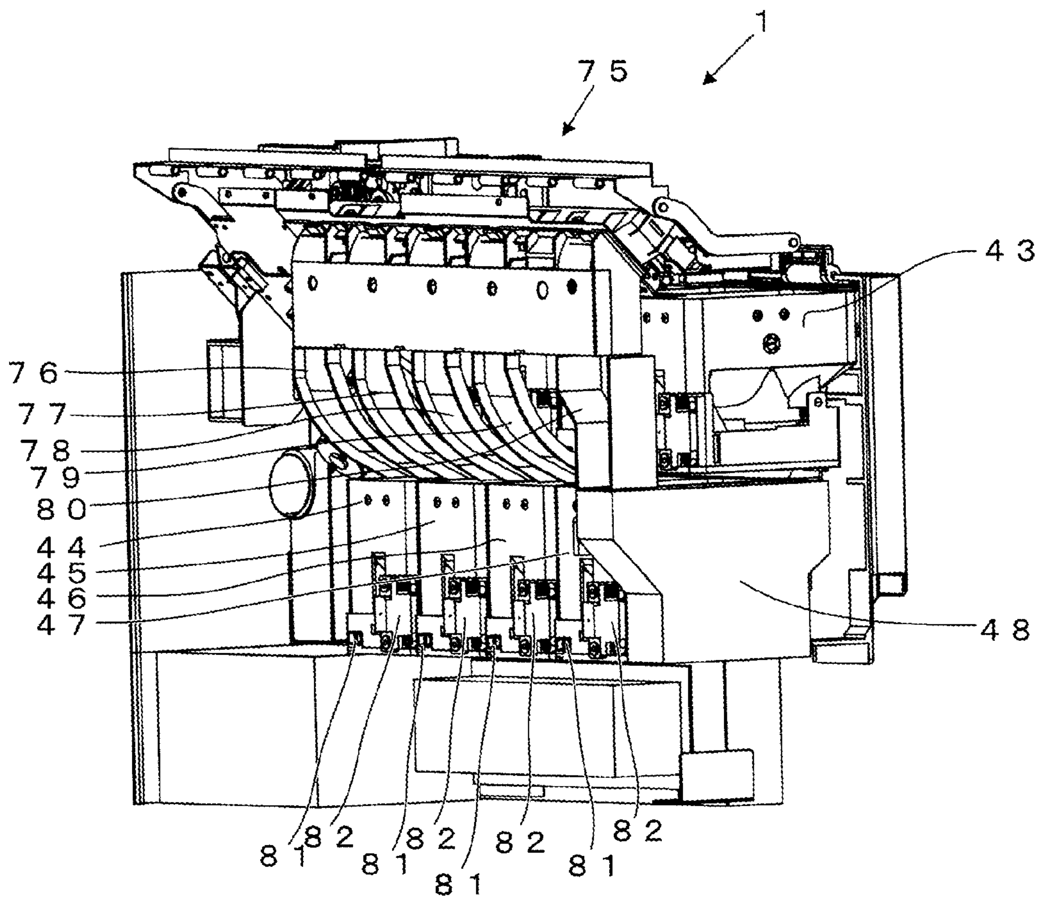
FIG. 7 is a view for explaining the back side of coin hoppers.

FIG. 7 is a view for explaining the back side of the coin hoppers. A moving route of coins from the distribution part 75 to the coin hoppers will be explained.

The coin guided to each bar-side path 73 by each distribution bar 71 arranged in the distribution part 75 is guided to each coin hopper arranged in the lower tier. A first path 76 is connected to the fifth hopper 44, a second path 77 is connected to the sixth hopper 45, a third path 78 is connected to the seventh hopper 46, and a fourth path 79 is connected to the eighth hopper 47. An overflow path 80 is connected to the overflow container 48.

The coin guided to each flap-side path 74 by each distribution flap 72 arranged in the distribution part 75 is guided to each of the coin hoppers arranged in the upper tier.

The coins with denominations identified are guided to respective paths according to denominations and stored in the coin hoppers arranged according to denominations.

FIG. 7 shows a state where bases on which the coin hoppers are placed are removed so that the coin hoppers on the lower tier can be seen. Each coin hopper is provided with a first spring 81 and a connector 82 on a side facing the discharge side of the coins.

Figure 8:
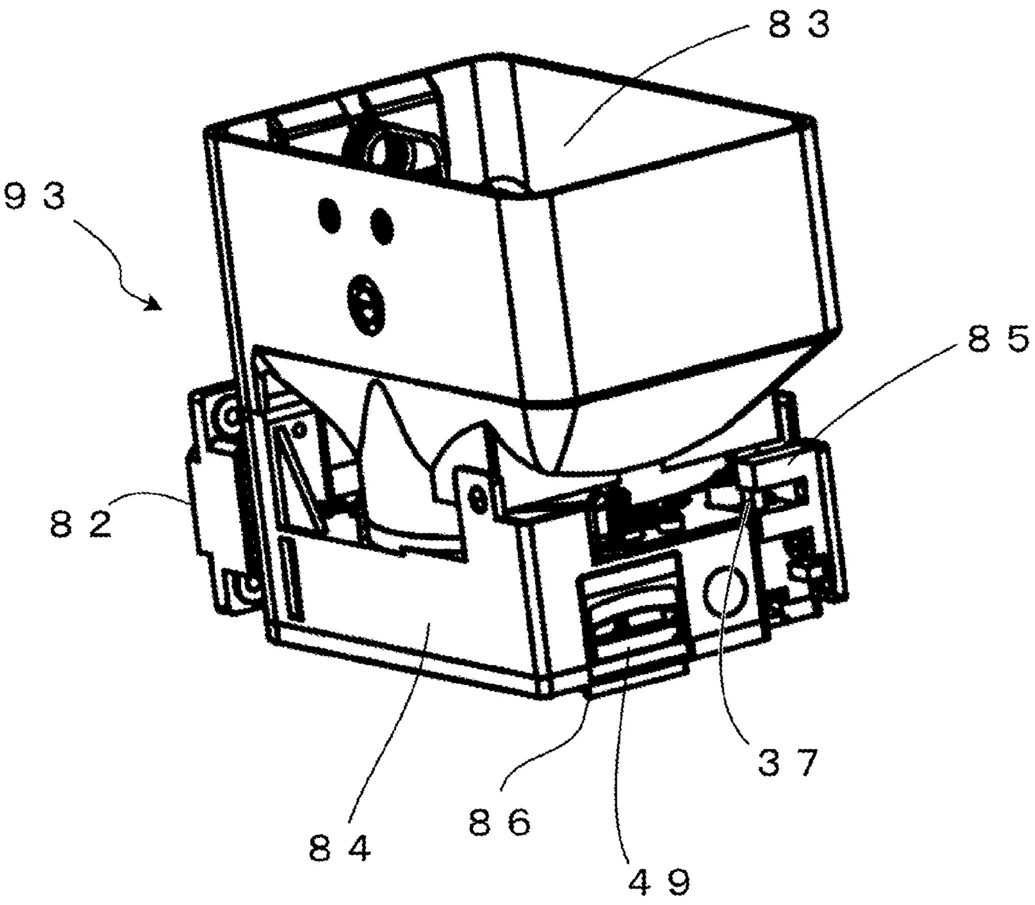
FIG. 8 is a view for explaining an example of the coin hopper.
Figure 9:
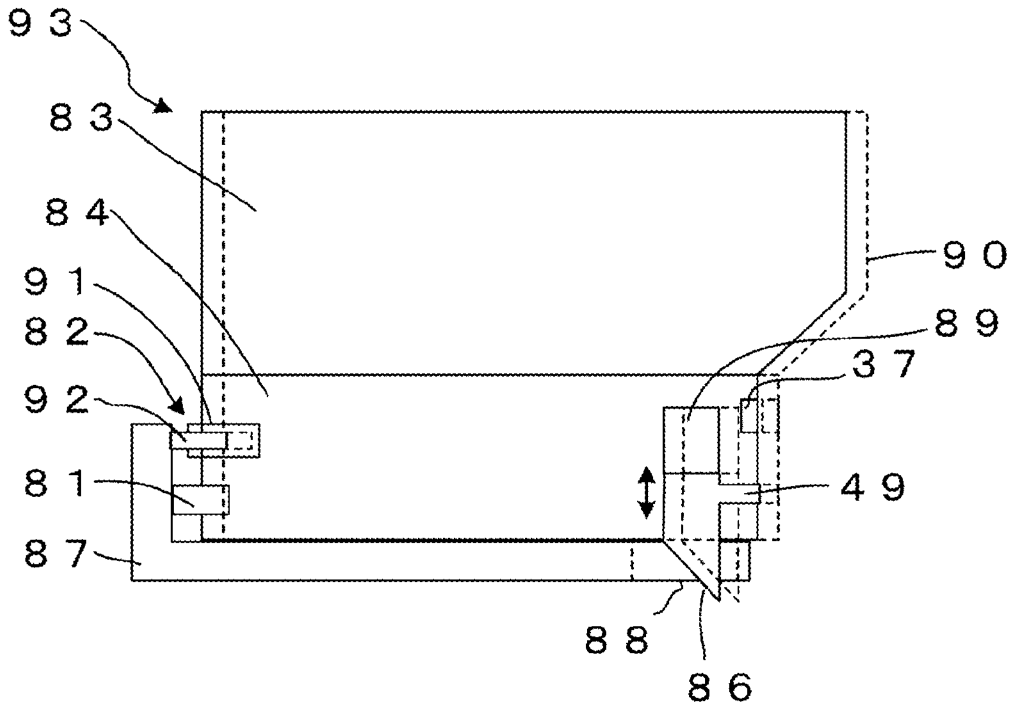
FIG. 9 is a view for explaining attachment/detachment of the coin hopper.

Next, the coin hopper will be explained with reference to FIG. 8 and FIG. 9. FIG. 8 is a view for explaining an example of the coin hopper. FIG. 9 is a view for explaining attachment/detachment of the coin hopper.

A coin hopper 93 includes a hopper container 83 temporarily keeps coins and a hopper body 84 discharging coins stored in the hopper container 83 one by one. The hopper body 84 includes a discharge part 37 discharging coins one by one and a sensor 85 detecting coins discharged from the discharge part 37. Coins to be discharged are detected by the sensor 85, a detected result is outputted to a not-shown control circuit, and the detected result is used for various kinds of control by the control circuit.

The gripping part 49 is provided on the discharge part 37 side of the coin hopper 93. On the side facing the discharge part 37 of the coin hopper 93, the connector 82 and the first spring 81 are provided.

In the coin handling apparatus 1, the coin hopper 93 can be attached/detached in a state where the first door 7 is opened. The coin hopper 93 is placed on a base 87. The base 87 has a standing part vertically standing on the base 87. The standing part can also be called a wall part arranged on the back side of the base 87, which is the opposite side of the first door 7. A body-side connector 92 is provided at the standing part of the base 87. A hopper-side connector 91 is provided in the coin hopper 93. The body-side connector 92 and the hopper-side connector 91 are connected. A contact between the body-side connector 92 and the hopper-side connector 91 is made to be long, thereby securing electrical connection regardless of the length of a stroke of insertion/extraction. The first spring 81 abuts on the standing part and pushes the standing part. The coin hopper 93 is biased in a discharging direction of coins by reaction force from the standing part.

An engaging hole 88 is formed on a surface of the base 87 on which the coin hopper 93 is placed. The engaging hole 88 is a hole or a groove provided in the base 87. A stopper 86 is engaged with the engaging hole 88. The stopper 86 is interlocked with the gripping part 49. The stopper 86 can be disengaged from the engaging hole 88 by operating the gripping part 49 and lifting up the stopper 86. The coin hopper 93 is provided with a second spring 89. The stopper 86 is biased in a direction of the engaging hole 88 by the second spring 89. The stopper 86 advances and retreats to and from the engaging hole 88.

When the coin hopper 93 is attached to the base 87, the coin hopper 93 is placed on the base 87 from the first door 7 side to be slid in a depth direction. As a tip end of the stopper 86 is inclined, the stopper 86 retreats upward and runs onto the base 87. The coin hopper 93 is further slid in the depth direction until the stopper 86 is engaged with the engaging hole 88. When the stopper 86 reaches the position of the engaging hole 88, the stopper 86 is biased by the second spring 89 to be inserted into the engaging hole 88. The coin hopper 93 is also pushed back by the biasing force of the first spring 81 until the stopper 86 abuts on an edge of the engaging hole 88. The coin hopper 93 is pushed by the first spring 81 to a foremost position 90 of the coin hopper 93 shown by a broken line and fixed there.

For example, in a case where deformation occurs in the first door 7 and the first door 7 abuts on the coin hopper 93, the first spring 81 is retracted to move the coin hopper 93. Since the coin hopper 93 can be moved even when an external force is applied, damage can be prevented.

The maintenance work of the paths for coins on the dispensing side and the coin hoppers can be executed by opening and closing the side surface on one side of the coin handling apparatus 1. Moreover, as the first door 7 side can be fully opened, the coin hoppers can be easily inserted/extracted, and the maintenance can be easily performed.

What is claimed is:

1. A coin handling apparatus comprising:

coin hoppers storing coins and discharging the stored coins one by one;

a partition plate separating a space where the coin hoppers are housed from paths for the coins discharged from the coin hoppers; and a case housing the coin hoppers, wherein the partition plate is a door provided in a side surface on one side of the case, and the coin hoppers are exposed by opening the door, the door includes a first door connected to the case and a second door connected to the first door, in a state in which the first door is closed, the first door separates the space where the coin hoppers are housed from a space that includes the paths for the coins discharged from the coin hoppers, in a state in which the first door and the second door are closed, paths for the coins discharged from the coin hoppers are formed between the first door and the second door, the second door includes recessed parts provided on a side facing the first door, and, in the state in which the first door and the second door are closed, protrusions arranged on the first door are configured to be fitted to the recessed parts to form the paths for the coins discharged from the coin hoppers.

2. The coin handling apparatus according to claim 1, wherein the first door includes discharge ports arranged so as to correspond to the respective coin hoppers and allowing the coins discharged from the coin hoppers to pass through, and sloped parts, as the protrusions, arranged so as to correspond to the respective discharge ports and protruding to the second door to guide the coins passing through the discharge ports diagonally downward, and the second door is arranged so as to face the first door and contacting the sloped parts to form paths for the coins discharged from the coin hoppers with the first door.

3. The coin handling apparatus according to claim 2, wherein a plurality of coin hoppers are aligned in each of a plurality of tiers which are at least two tiers or more including an upper tier and a lower tier, and the discharge ports corresponding to the coin hoppers arranged in the lower tier are disposed at a vertical direction of the sloped parts corresponding to the coin hoppers arranged in the upper tier.

4. The coin handling apparatus according to claim 3, wherein a base fixing the coin hopper so as to be attachable/detachable is provided inside the case, the base has a standing part on a side facing the door, the coin hopper includes a spring biasing the standing part and a stopper arranged on a back side of the coin hopper, the stopper being configured to advance and retreat, the base has an engaging part at a position corresponding to the stopper, and the coin hopper is biased by the spring in a direction apart from the standing part, and the coin hopper is fixed to the base in a state where the stopper inserted into the engaging part abuts on a surface of the engaging part on the door side.

5. The coin handling apparatus according to claim 2, further comprising:

a first belt arranged below the coin hoppers and conveying the coins discharged from the coin hoppers;

a second belt arranged with inclination, receiving the coins from the first belt and conveying the coins to a higher position than a height where the first belt is arranged; and a dispensing port from which the coins delivered from the second belt are dispensed.

6. The coin handling apparatus according to claim 5, wherein a base fixing the coin hopper so as to be attachable/detachable is provided inside the case, the base has a standing part on a side facing the door, the coin hopper includes a spring biasing the standing part and a stopper arranged on a back side of the coin hopper, the stopper being configured to advance and retreat, the base has an engaging part at a position corresponding to the stopper, and the coin hopper is biased by the spring in a direction apart from the standing part, and the coin hopper is fixed to the base in a state where the stopper inserted into the engaging part abuts on a surface of the engaging part on the door side.

7. The coin handling apparatus according to claim 1, wherein a base fixing the coin hopper so as to be attachable/detachable is provided inside the case, the base has a standing part on a side facing the door, the coin hopper includes a spring biasing the standing part and a stopper arranged on a back side of the coin hopper, the stopper being configured to advance and retreat, the base has an engaging part at a position corresponding to the stopper, and the coin hopper is biased by the spring in a direction apart from the standing part, and the coin hopper is fixed to the base in a state where the stopper inserted into the engaging part abuts on a surface of the engaging part on the door side.

8. The coin handling apparatus according to claim 2, wherein a base fixing the coin hopper so as to be attachable/detachable is provided inside the case, the base has a standing part on a side facing the door, the coin hopper includes a spring biasing the standing part and a stopper arranged on a back side of the coin hopper, the stopper being configured to advance and retreat, the base has an engaging part at a position corresponding to the stopper, and the coin hopper is biased by the spring in a direction apart from the standing part, and the coin hopper is fixed to the base in a state where the stopper inserted into the engaging part abuts on a surface of the engaging part on the door side.

9. A coin handling apparatus comprising:

coin hoppers storing coins and discharging the stored coins one by one;

a partition plate separating a space where the coin hoppers are housed from paths for the coins discharged from the coin hoppers; and a case housing the coin hoppers, wherein the partition plate is a door provided in a side surface on one side of the case, the coin hoppers are exposed by opening the door, a base fixing the coin hopper so as to be attachable/detachable is provided inside the case, the base has a standing part on a side facing the door, the coin hopper includes a spring biasing the standing part and a stopper arranged on a back side of the coin hopper, the stopper being configured to advance and retreat, the base has an engaging part at a position corresponding to the stopper, and the coin hopper is biased by the spring in a direction apart from the standing part, and the coin hopper is fixed to the base in a state where the stopper inserted into the engaging part abuts on a surface of the engaging part on the door side.

* * * * *